No. 728,039. PATENTED MAY 12, 1903.
B. A. STOWE.
ELECTRIC MOTOR.
APPLICATION FILED JULY 24, 1902.
NO MODEL. 4 SHEETS—SHEET 1.
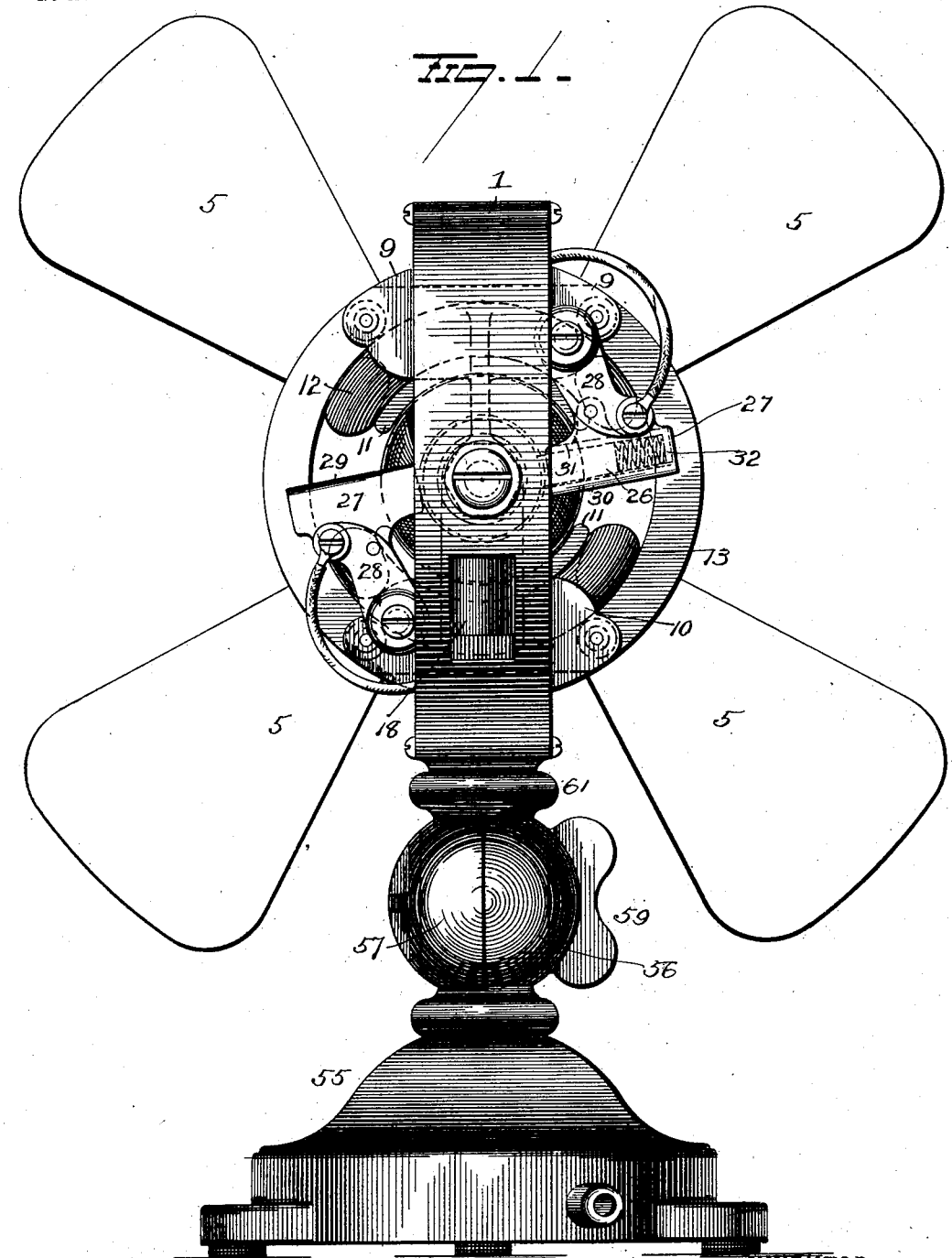
WITNESSES
INVENTOR

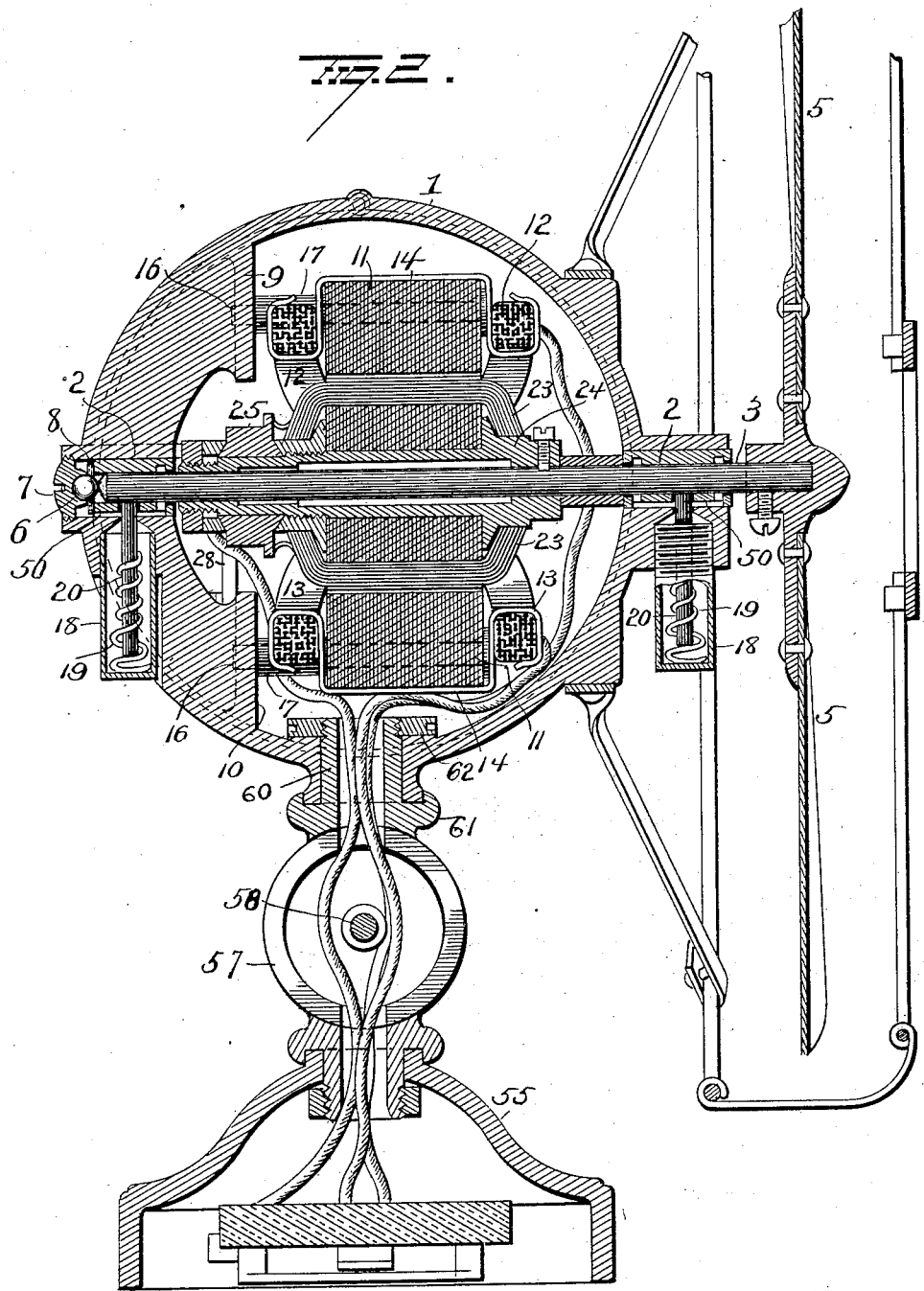

No. 728,039. PATENTED MAY 12, 1903.
B. A. STOWE.
ELECTRIC MOTOR.
APPLICATION FILED JULY 24, 1902.
NO MODEL. 4 SHEETS—SHEET 3.
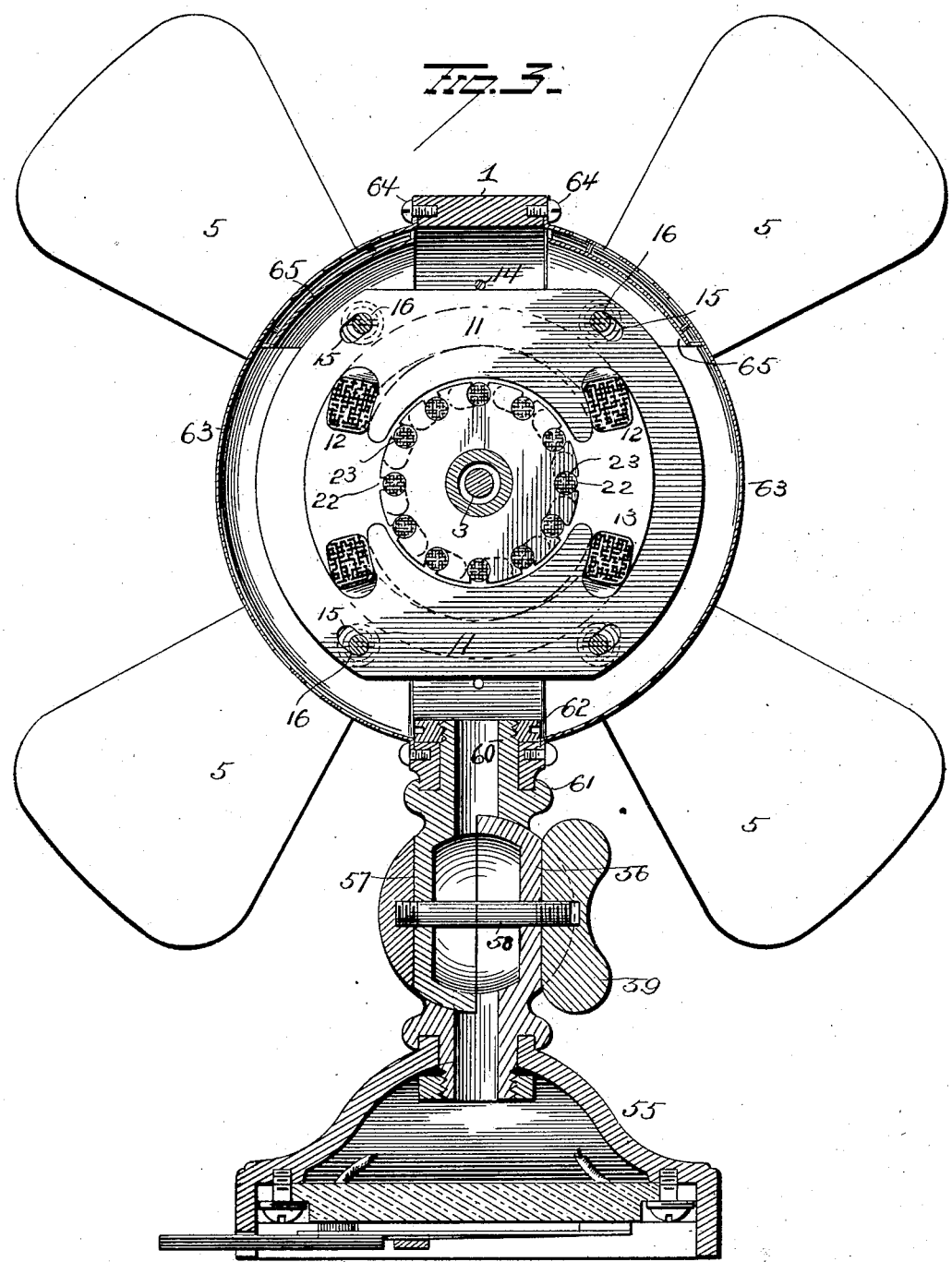

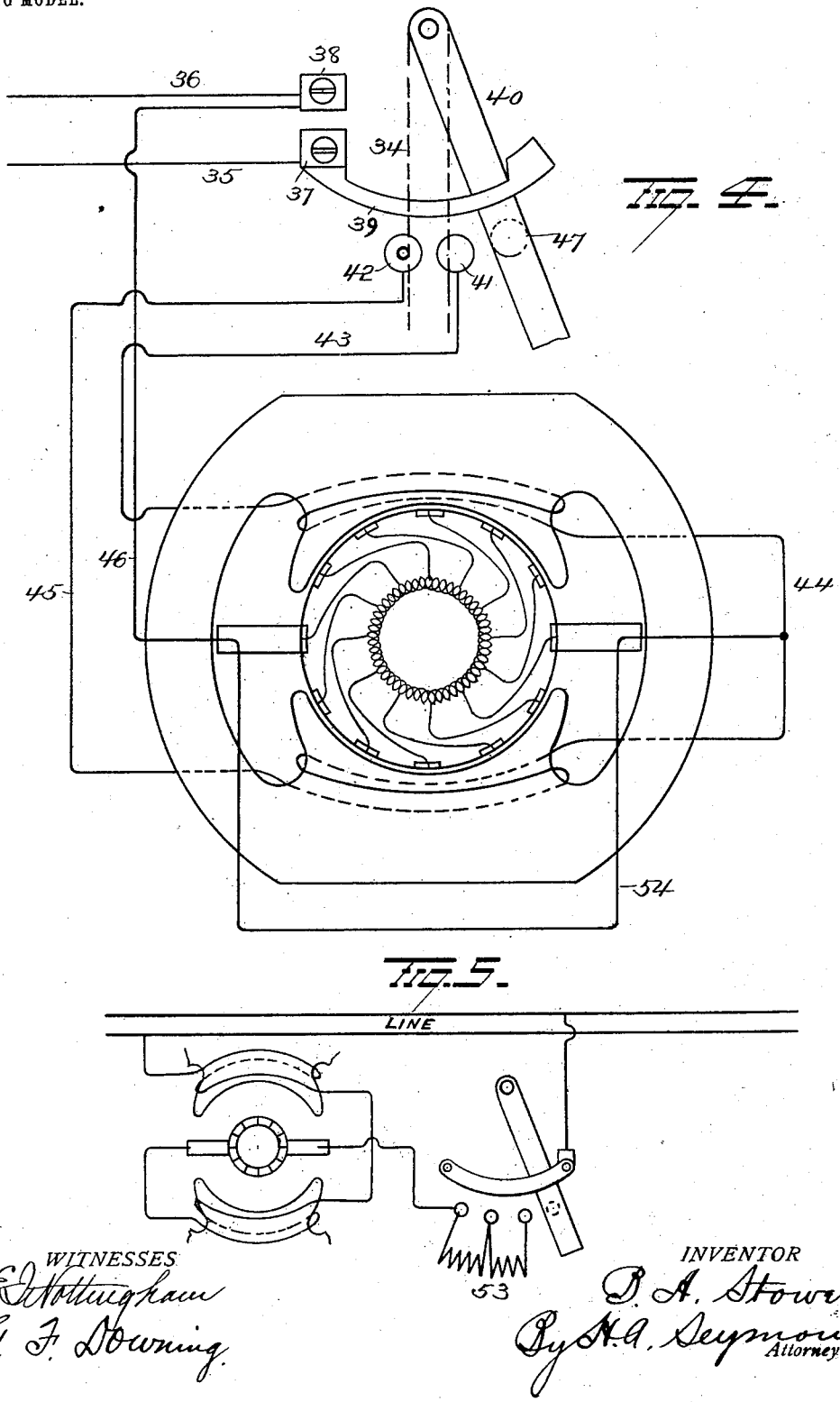

No. 728,039. Patented May 12, 1903.

UNITED STATES PATENT OFFICE.

BERNARD A. STOWE, OF CLEVELAND, OHIO, ASSIGNOR TO THE JANDUS ELECTRIC COMPANY, OF CLEVELAND, OHIO.

ELECTRIC MOTOR.

SPECIFICATION forming part of Letters Patent No. 728,039, dated May 12, 1903.

Application filed July 24, 1902. Serial No. 116,847. (No model.)

*To all whom it may concern:*

Be it known that I, BERNARD A. STOWE, of Cleveland, in the county of Cuyahoga and State of Ohio, have invented certain new and useful Improvements in Electric Motors; and I do hereby declare the following to be a full, clear, and exact description of the invention, such as will enable others skilled in the art to which it appertains to make and use the same.

My invention relates to an improvement in electric motors, one object of the invention being to provide an improved motor which will operate effectually with direct electric currents and which can be readily adapted for use with alternating currents.

A further object is to improve the construction of electric motors in such manner as to render the same particularly adaptable for use for fans and similar purposes.

A further object is to construct the motor in such manner that the working parts thereof will not become disarranged relatively to each other if the motor should happen to be subjected to rough treatment.

A further object is to construct and arrange the bearings of the rotating member of the motor in such manner that both of said bearings shall be in the casting, whereby the accurate alinement of said bearings will be at all times insured.

A further object is to provide a simple and efficient thrust-bearing for the shaft of the rotating member of the motor.

A further object is to so mount the stationary member of the motor that its connection with its support shall be sufficiently elastic to compensate for jars and vibrations to which the motor might at times be subjected.

A further object is to improve the construction of electric fans in certain other particulars, as hereinafter set forth, and pointed out in the claims.

With these objects in view the invention consists in various novel features of construction and combinations and arrangements of parts, as hereinafter set forth, and pointed out in the claims.

In the accompanying drawings, Figure 1 is a view illustrating an electric fan embodying my improvements. Fig. 2 is a vertical sectional view. Fig. 3 is a similar view taken at right angles to Fig. 2. Fig. 4 is a diagrammatical view of the circuits when the motor is used with an alternating current. Fig. 5 is a similar diagram, showing the circuits when the motor is operated with a direct current.

1 represents an annular frame made in a single casting and provided at diametrically opposite points with alined holes for the reception of bushings 2, which constitute bearings for the shaft 3 of the rotary member of the motor. By making the frame 1 in a single casting the holes for the bearings of the armature-shaft 3 can be accurately located and be always in perfect alinement, thus avoiding all possibility of the shaft binding in its bearings or the rotary member getting out of proper relation to the stationary member of the motor, as often occurs with motors where the frame is made in two parts secured together by means of bolts or screws and the respective bearings for the shaft located in the respective parts of the frame. The fan 5 is secured to one end of the shaft 3, and it is desirable that the other end of said shaft shall have an effective thrust-bearing. For this reason the end of the shaft is made slightly conical and bears against a steel antifriction-ball 6, mounted in a nut 7, screwed into the frame. A felt washer 8 is preferably inserted between the end of the shaft and the nut 7 and saturated with lubricant, said washer having a central hole to permit the end of the shaft to bear against the antifriction-ball, as above explained.

The frame 1 is provided with removable lubricant-cups 18, which are made to communicate with the bearings of the armature-shaft. In each cup a conical spring 19 is located, and in this spring a wick 20 is secured and made to bear at its upper end against the armature-shaft to convey oil thereto from the cups by capillary attraction, and the bushings are provided with ducts 50 for the return of oil to the wicks.

The annular frame 1 is provided near its top with laterally-projecting ears 9 and near its bottom with ears 10. To these ears the stationary member of the motor is secured. The stationary member or field-magnet frame comprises a number of iron laminations having a general annular form and provided at diametrically opposite points with concave enlargements which constitute the pole-pieces 11. Instead of making the field bipolar it may be made multipolar. The field-magnet coils 12 13 are wound on the pole-pieces and are held properly in place by means of tie-wires 14. The laminated field-magnet frame is provided at its four corners with holes 15 (preferably somewhat elongated) for the passage of bolts 16. Each bolt 16 is provided at one end with a head, and at the other end it is threaded to enter a threaded hole in one of the ears of the frame 1. Spacing-sleeves 17 are placed on the bolts and bear at their respective ends against the field-magnet frame and the ears on frame 1. The laminæ composing the field-magnet frame being made of thin annular disks they will not lie perfectly close together until some clamping pressure is applied to them, and when this pressure is removed they will tend to separate slightly. The clamping pressure is here applied by the bolts 16, which when tightened will press the laminæ together in opposition to the resistance offered by the laminæ due to the resilience of the same in their tendency to separate. Thus the connection of the field-magnets with the frame 1 is of a somewhat resilient character, sufficiently so, in fact, that any jar to which the motor may be subjected in rough usage will be compensated for and the disarrangement of the parts of the motor prevented.

The armature is of the drum type, having diagonal slots 22 for the reception of the armature-coils 23. The core of the armature comprises a series of iron laminations clamped together on a hub 24, (which may be of brass,) and the shaft 3 passes through this hub. A commutator 25 is located on the hub 24 and commutator-brushes 26 coöperate with the same. The commutator-brushes 26 are preferably made of carbon and are supported in holders 27, secured to but insulated from the frame 1. Each holder 27 comprises an arm 28, carrying a housing 29. This housing consists of two elongated jaws 30 31, the jaw 30 being made integral with the arm 28 and the jaw 31 pivotally attached at a point between its ends to the arm. A spring 32 is located within the housing and bears at one end against the closed end of the pivoted jaw 31. The spring 32 bears its other end against the carbon brush 26 and serves to feed the same outwardly as it becomes worn. The spring 32 also acts to press the lips at the forward ends of the jaws against the carbon brush. Further description of the construction and operation of the brush-holder is unnecessary herein, as I do not in this case wish to make claim thereto.

When the motor is to be operated with a direct current, the armature-coils may be connected with the commutator-segments, as shown in Fig. 5; but when the motor is to be operated with alternating currents the proper lead of the coils relatively to the field-magnets, as is desirable in alternating-current motors, can be effected by connecting the terminals of the coils with the commutator-segments out of line with or laterally removed from the axes of the coils, as shown in Fig. 4, or the said lead may be accomplished by shifting the lead of the brushes. In connecting the motor-windings for use with alternating currents the field-magnet coils are arranged in parallel and the armature-windings are included in circuit with the field-windings. The reason for this is to provide ready means for changing the speed of the motor, a switch 34 being provided for connecting the field-coils in parallel when maximum speed is desired and for cutting out one field-coil and using the other alone in series with the armature when a slower speed is desired. The arrangement of circuits above alluded to is fully illustrated in Fig. 4 of the drawings. In this figure the leading-in wires 35 36 are shown connected with the binding-posts 37 38 of the switch 34. This switch comprises a segment 39 integral with the binding-post 37, a pivoted arm 40 making electrical contact with the segment 39 and contact-posts 41 42. The contact-post 41 is connected by a wire 43 with one end of one of the field-magnet coils, and the other end of this coil is connected by a wire 44 with one end of the other field-magnet coil, the other end of the latter being in turn connected with the contact-post 42 by a wire 45. The wire 44 is connected with one of the commutator-brushes, and the other commutator-brush is connected, by means of a conductor 46, with the binding-post 38. From this arrangement of circuits it will be seen that when the switch-arm 40 is on the idle post 47 the motor will be open-circuited and at rest. In starting the motor when the switch-arm is moved to the contact-post 41 the circuit can be readily traced through one of the field-magnet coils and the armature-coils in series. When the switch-arm is moved farther, so as to bridge the contact-posts 41 42, the two field-magnet coils will be arranged in parallel with each other and the armature in series, as before, when the speed of the motor will be increased. In order to obtain a slower speed than is had when the single field-coil is in circuit, the field-magnet coils may be arranged in series with each other. When the motor is to be operated with a direct current, the circuits will be arranged as shown in Fig. 5 and a suitable rheostat 53 included in the circuit. When the motor is to be used with alternating currents, a low-resistance conductor 54 will be connected at its respective ends with the brushes for the purpose of reducing excessive sparking at the brushes. I do not in this application wish to claim this arrangement of circuits, but reserve the same for a separate application for patent, filed July 12, 1902, and designated by Serial No. 115,353.

To conveniently support the annular motor-frame 1 to adapt the apparatus for use as an electric fan, a base 55 is provided. A standard projects from the center of the base 55 and comprises two members 56 and 57, pivotally connected together by means of a bolt 58 and normally locked at any desired adjustment by means of a thumb-nut 59. The upper member of the standard is provided with a threaded shank 60, which passes upwardly through a hole in the bottom of the frame 1, and at the base of said shank the member 57 of the standard is provided with an integral collar 61, which bears against the bottom of the frame 1. A nut 62 is screwed on the upper end of the shank 60, by means of which the frame 1 is secured to the standard. By loosening this nut the motor-frame can be turned to any desired adjustment, and by loosening the nut 59 the members of the standard can be adjusted relatively to each other and the apparatus adapted for desk or wall use.

The operating parts of the motor are inclosed by a perforated sheet-metal shell comprising two sections 63, attached to the frame by means of screws 64 and provided with a guard 65 under the upper perforations.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. The combination with an annular frame made in a single piece and having holes at diametrically opposite points, of bearing-sleeves secured in said holes, field-magnets secured to the frame, an armature, a shaft secured to the armature and mounted in said bearing-sleeves, a nut screwed into the frame in line with the shaft, and an antifriction-ball mounted in and carried by said nut in position to receive the end thrust of the shaft, and a perforated lubricating-washer between the end of the shaft and said nut.

2. The combination with a frame, field-magnets and an armature mounted in said frame, of a base, a standard projecting from said base and having a screw-threaded shank at its upper end passing through a hole in the frame, and a nut screwed on said shank, whereby the frame is adjustably secured to the standard.

3. The combination with a frame, of field-magnets consisting of numerous thin laminations, said field-magnets having a series of elongated slots, bolts passing through said slots and entering the frame, and heads on the other ends of said bolts.

4. The combination with a frame and ears projecting laterally in both directions therefrom, of field-magnets, headed bolts passing through said field-magnets and secured at one end to the ears of the frame, an armature, a shaft secured to said armature and mounted in alined bearings in the frame, a commutator carried by the armature and connected with the coils thereof, brush-holders attached to two ears of the frame and commutator-brushes mounted in said holders.

5. The combination with a frame having holes at diametrically opposite points, of sleeves or bushings in said holes, an armature, a shaft therefor mounted in said sleeves or bushings, lubricant-cups, springs disposed in said cups, wicks carried by said springs for feeding lubricant from said cups to the bearings of the armature-shaft, in the sleeves or bushings, said sleeves or bushings having ducts to return lubricant to said cups, and field-magnets secured to said frame.

In testimony whereof I have signed this specification in the presence of two subscribing witnesses.

BERNARD A. STOWE.

Witnesses:
J. POTTER,
C. R. MEGERTH.